United States Patent
Nishida et al.

[11] Patent Number: 5,604,652
[45] Date of Patent: Feb. 18, 1997

[54] TAPE SPEED CONTROL APPARATUS USING ROTATION SPEED RATIO OF FIRST AND SECOND TAPE REELS

[75] Inventors: Masafumi Nishida, Ibaraki; Osamu Yamaguchi, Katano; Souichirou Fujioka, Sakai; Hiroshi Okamoto, Nara; Yoshiho Gotoh, Osaka, all of Japan

[73] Assignee: Matsushita Electric Industrial Co., Ltd., Osaka, Japan

[21] Appl. No.: 448,975

[22] Filed: May 24, 1995

Related U.S. Application Data

[63] Continuation of Ser. No. 942,825, Sep. 10, 1992, abandoned.

[30] Foreign Application Priority Data

| Sep. 10, 1991 | [JP] | Japan | 3-230148 |
| Sep. 24, 1991 | [JP] | Japan | 3-243072 |
| Sep. 24, 1991 | [JP] | Japan | 3-243078 |
| Feb. 25, 1992 | [JP] | Japan | 4-037641 |

[51] Int. Cl.$^6$ .................................. G11B 15/54
[52] U.S. Cl. ..................... 360/73.14; 242/334.4
[58] Field of Search .................. 360/73.14, 73.01, 360/73.09, 73.08, 73.05; 242/334.3, 334.5, 334.6, 334.4

[56] References Cited

U.S. PATENT DOCUMENTS

| 4,015,799 | 4/1977 | Koski et al. | 242/334.4 |
| 4,398,227 | 8/1983 | Anderson | 360/73.04 X |
| 4,448,368 | 5/1984 | Skalko | 242/334.3 X |
| 4,461,433 | 7/1984 | Kani | 360/73.08 X |
| 4,525,654 | 6/1985 | Tajima et al. | 360/73.14 |
| 4,531,166 | 7/1985 | Anderson | 360/73.09 |
| 4,731,679 | 3/1988 | O'Gwynn et al. | 360/73.14 |
| 4,739,950 | 4/1988 | Goker et al. | 360/73.14 X |
| 5,039,027 | 8/1991 | Yanagihara et al. | 242/334.2 |
| 5,085,379 | 2/1992 | Uchikoshi et al. | 360/73.14 X |
| 5,157,971 | 10/1992 | Mori | 360/73.14 X |
| 5,166,841 | 11/1992 | Wakiyama et al. | 360/73.14 |

FOREIGN PATENT DOCUMENTS

| 2503911 | 4/1982 | France . |
| 63-300450 | 12/1988 | Japan . |
| 63-300449 | 12/1988 | Japan . |
| 02156375 | 6/1990 | Japan . |

OTHER PUBLICATIONS

*Microelectronic Circuits*, p. 8, Sedia and Smith, © 1987, CBS College Publishing.

*Primary Examiner*—Andrew L. Sniezek
*Assistant Examiner*—James L. Habermehl
*Attorney, Agent, or Firm*—Wenderoth, Lind & Ponack

[57] ABSTRACT

A tape speed command signal is differentiated, and in a multiplier, the torque necessary for acceleration or deceleration of a take-up reel motor is calculated in accordance with the moment of inertia of a take-up reel and a winding radius of the tape on the take-up reel. The calculated result is added to a torque command produced by a feedback control system.

2 Claims, 9 Drawing Sheets

TAPE SPEED
COMMAND

FIG. 3(b)

TAPE SPEED
RESPONSE

— TAPE
SPEED
COMMAND

FIG. 3(c)

TAPE SPEED
RESPONSE

— TAPE
SPEED
COMMAND

FIG. 3(d)

TAPE SPEED
RESPONSE

FIG. 7(a)
PRESET TAPE SPEED

FIG. 7(b)
TAPE SPEED COMMAND

FIG. 7(c)
MOTOR TORQUE

PRESET TAPE SPEED

FIG. 9(b)

SLOPE GENERATOR OUTPUT

FIG. 9(c)

TAPE SPEED COMMAND

FIG. 9(d)

MOTOR TORQUE

FIG. 11

TAPE SPEED CONTROL APPARATUS USING ROTATION SPEED RATIO OF FIRST AND SECOND TAPE REELS

This application is a continuation of now abandoned application, Ser. No. 07/942,825, filed on Sep. 10, 1992.

BACKGROUND OF THE INVENTION

1. Field of the Invention

The present invention relates to a tape speed control apparatus used in a tape running system of a video tape recorder (VCR) or the like.

2. Description of the Prior Art

A tape running system of a magnetic recording and reproducing apparatus, such as a VCR, have a supply reel on which a tape is wound and a take-up reel for taking up the tape drawn from the supply reel. In general, the take-up reel is driven by a take-up reel motor so as to control a tape speed at which the tape is transferred and the supply reel is driven by a supply reel motor to keep the tension of the drawn-out tape at a specific tension.

Hitherto, it has been attempted to detect the speed of the tape or the rotatinal speed of the take-up reel and control the tape transfer by a feedback control system. For example, the tape speed is detected and compared with a tape speed command. If the detected tape speed is smaller than the tape speed command, the torque of a take-up reel motor for driving the take-up reel is increased to accelerate the take-up reel motor. If the detected tape speed is larger than the tape speed command, the torque of the take-up reel motor is decreased to decelerate the motor. As a result, the tape speed is controlled such that the detected tape speed and the command may coincide with each other.

In such a conventional constitution, a time delay occurs in the response of the tape speed to the tape speed command. Accordingly, there are serious problems in operability. For example, 1) the tape speed cannot respond to a quick change of the tape speed command set from outside, 2) the acceleration of the tape to the maximum speed takes a considerable amount of time, and 3) the tape fairly goes beyond a position at which an operator wishes to stop the tape during a high speed search. Since in particular, the VCRs for professional use are frequently used in editing, the improvement in the response of the tape speed to a shuttle dial operation has been demanded.

In addition, the overshoot of the tape speed sometimes occurs. In the case of changing from the state of a high speed search to the state of pause in a VCR, the tape stops through the temporary state of reverse playback once. This operation badly affects the feeling of the operability.

SUMMARY OF THE INVENTION

It is hence a primary object of the invention to provide a tape speed control apparatus which has an excellent response to any change of the tape speed command without time delay and overshoot.

To achieve the above object, a tape speed control apparatus of the present invention comprises: a first reel on which a tape is wound; a second reel for drawing the tape out of the first reel and taking up the drawn-out tape; a first motor for directly driving the first reel and giving a specific back tension to the tape; a second motor for directly driving the second reel; a tape speed command means for producing a tape speed command signal from a specific tape speed set from outside; a differentiator for differentiating the tape speed command signal; a parameter estimation unit for estimating the moment of inertia of the second reel and a winding radius of the tape wound on the second reel and for outputting a signal indicative of the estimated moment of inertia and winding radius; a divider for determining a ratio of the moment of inertia of the second reel to the winding radius of the tape wound on the second reel from the output signal of the parameter estimation unit; a multiplier for multiplying an output of the differentiator by an output of tie divider; a tape speed detecting means for detecting a tape speed; a comparing means for comparing an output of the tape speed detecting means with the tape speed command signal; an adder for summing at least an output of the multiplier and an output of the comparing means, and a driving circuit responsive to an output of the adder for driving the second motor to generate a torque proportional to the output of the first adder.

DESCRIPTION OF THE PREFERRED EMBODIMENTS

Figure 1:
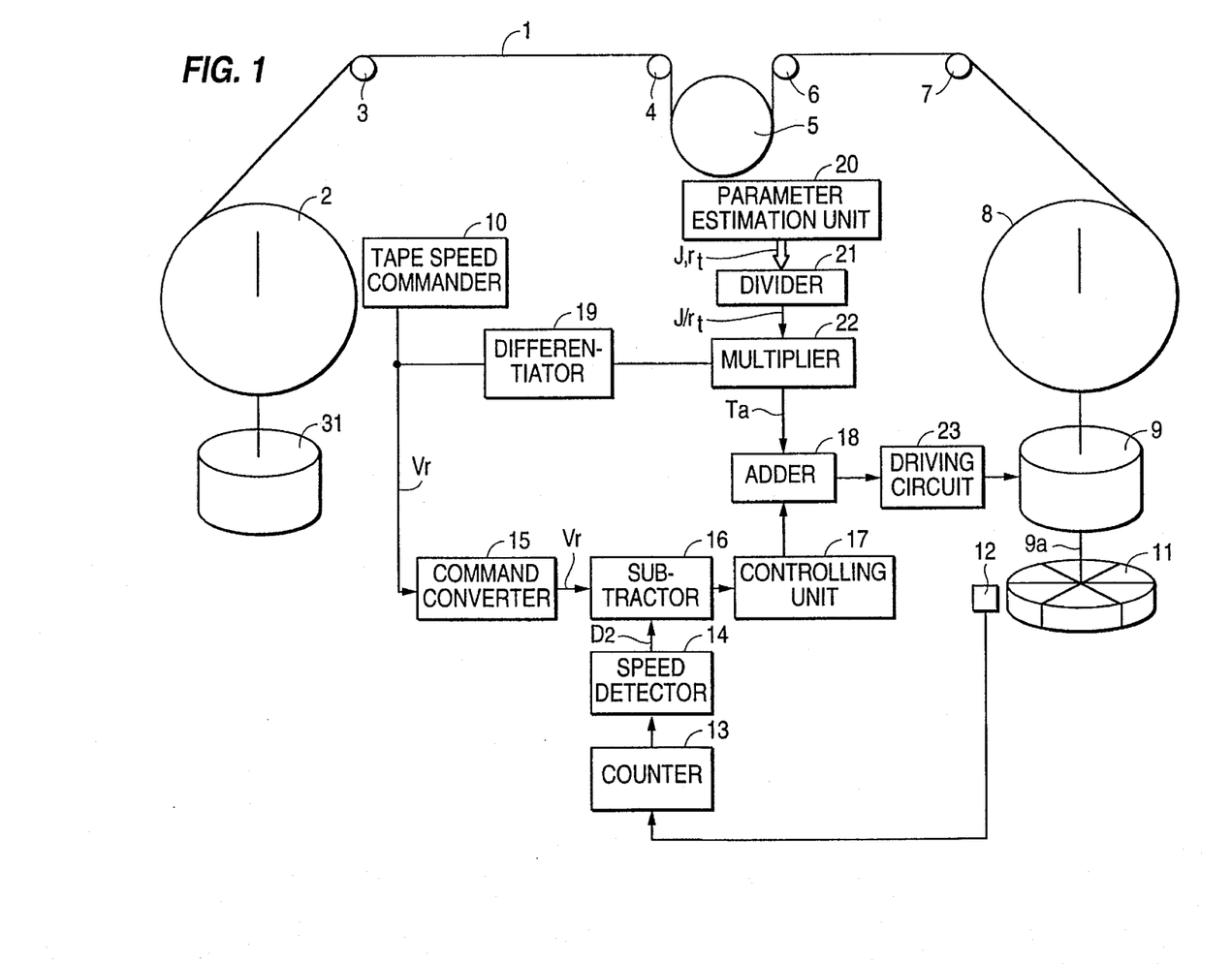
FIG. 1 is a structural diagram of a tape speed control apparatus in accordance with a first embodiment of the present invention.

FIG. 1 is a block diagram showing a structure of a tape speed control apparatus in accordance with a first embodiment of the present invention. Tape 1 is unwound from a supply reel 2 to be diagonally wound on a rotary drum 5 over a specific angle through posts 3 and 4, and then wound around a take-up reel 8 via posts 6 and 7. The rotary drum 5 is equipped with a magnetic head for helical scanning of the tape 1 to perform signal recording or reproduction.

The tape tension is controlled by the supply reel 2. The supply reel 2 is directly driven by a first motor 31. A tape speed commander 10 produces a tape speed command signal in response to an externally set tape speed which may be set by an external device such as a shuttle dial. The tape speed is controlled by the take-up reel 8. The take-up reel 8 is directly driven by a second motor 9. A multipolar-magnetized magenet 11 is mounted on a rotary shaft 9a of the second motor 9. The magnet 11 rotates in synchronism with the second motor 9, and a magnetic flux detecting element 12 confronting the magnet 11 produces a train of pulses at a frequency which is proportional to the rotational speed of the second motor 9. A second detector 14 detects a signal having a value proportional to the rotational speed of the take-up reel 8 or the second motor 9 from an output signal of a counter 13 for counting the pulses outputted from the magnetic flux detecting element 12. This signal can be obtained by finding a change of the count value of the counter 13 in a given time period $t_1$. A value $D_2$ of the output signal of the speed detector 14 is expressed by the following formula:

$$D_2 = Z \cdot t_1 \cdot N_t \quad (1)$$

where Z is the number of pulses produced by the magnetic flux detecting element 12 during one rotation of the take-up reel 8, and $N_t$ is the rotational speed of the take-up reel 8. It may be understood that the value $D_2$ is proportional to the rotational speed of the take-up reel 8. The value $D_2$ can be expressed also by the following formula:

$$D_2 = K_1 \cdot V_t, K_1 = \frac{Z \cdot t_1}{2 \pi r_t} \quad (2)$$

where $V_t$ is the actual tape speed, $r_t$ is the radius of a tape portion wound around the take-up reel 8 (hereafter referred to as the winding radius), and $K_1$ is a detection sensitivity. It may be understood that the value $D_2$ is proportional to the actual tape speed. However, care must be taken to the fact that the detection sensitivity $K_1$ changes depending on the winding radius of the take-up reel 8. A command converter 15 converts a value $V_r$ of the tape command signal outputted from the tape speed commander 10 to a value $V_r'$ expressed as:

$$V_r' = K_2 \cdot V_r, K_2 = K_1 = \frac{Z \cdot t_1}{2 \pi r_t} \quad (3)$$

where $K_2$ is a conversion coefficient. The conversion coefficient $K_2$ varies with the change of the winding radius of the take-up reel 8. The winding radius of the take-up reel 8 can be obtained by, for example, a parameter estimation unit 20 which will be described later. A subtractor 16 subtracts the output value of the command converter 15 from the output value the speed detector 14. The subtraction result is fed to a controlling unit 17. The controlling unit 17 determines manipulated variable from the subtraction result (controlled deviation) and outputs a signal indicative of the manipulated variable to an adder 18.

On the other hand, the output signal of the tape speed commander 10 is differentiated by a differentiator 19 to obtain a tape speed acceleration command signal. A multiplier 22 functions to find a acceleration torque signal $T_a$ for subjecting the take-up reel 8 to acceleration and deceleration corresponding to the tape acceleration command signal. This acceleration torque signal $T_a$ can be expressed by the following formula:

$$T_a = J \cdot \frac{1}{r_t} \cdot \frac{d}{dt}(V_r) \quad (4)$$

where J is an innertia moment of the take-up reel 8. Parameters J and $r_t$ change every moment as the tape runs. A parameter estimation unit 20 estimates values of these parameters successively. A divider 21 calculates a division $J/r_t$ from the output datum of the parameter estimation unit 20. The multiplier 22 multiplies the output signal of the divider 21 by the output signal of the differentiator 19 to obtain an acceleration torque signal $T_a$ which will be fed to the adder 18. The adder 18 adds the output signal of the multiplier 22 and the output siganl of the controlling unit 17. A driving circuit 23 drives the second motor 9 so as to produce a torque corresponding to a value of an output signal of the adder 18.

Figure 2:
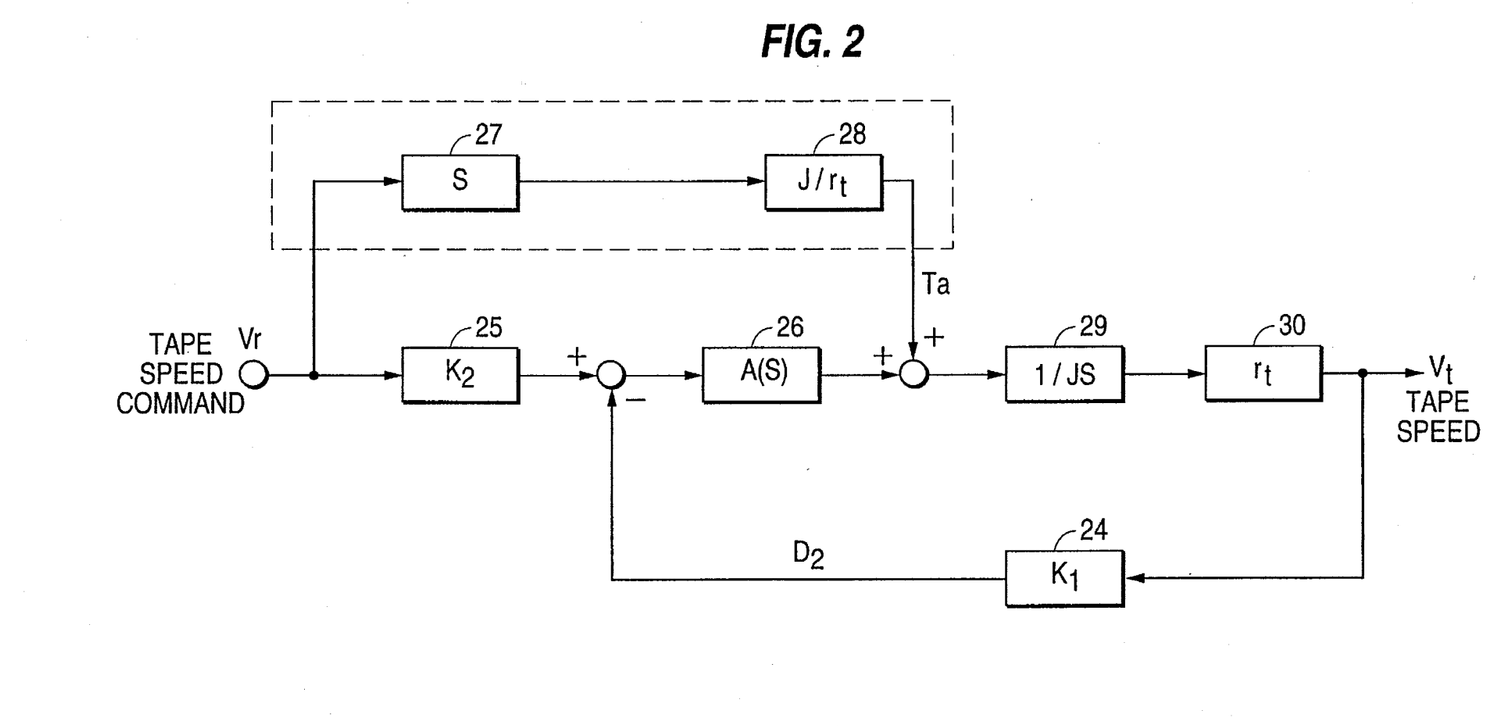
FIG. 2 is a transfer function block diagram of the tape speed control apparatus in accordance with the first embodiment of the present invention.

FIG. 2 shows the above-described structure by way of an equivalent transfer function block from the output signal $V_r$ of the tape speed commander 10 to the tape speed $V_t$, wherein element 24 is a transfer function from the tape speed to the detected value of the tape speed; element 25 is a transfer function of the command converter 15; element 26 is a transfer function of the controlling unit 17; element 27 is a transfer function of the differentiator 19; element 28 is a transfer function of the multiplier 22; element 29 is a transfer function from the torque signal of the second motor 9 to the rotational speed of the take-up reel 8, and element 30 is a transfer function from the rotational speed of the take-up reel 8 to the tape speed.

In the conventional structure relying only on a feedback control system, the portion enclosed by a dotted line in FIG. 2, namely the portion constituted by the differentiator 19 and the multiplier 22, is not provided. In this case, the transfer function $H_1$ (s) from the tape speed command signal $V_r$ to the tape speed is expressed by the following formula:

$$H_1(s) = \frac{V_t}{V_r} = \frac{K_1 \cdot r_t \cdot A(s)}{J \cdot s + K_1 \cdot r_t \cdot A(s)} \quad (5)$$

If the transfer function of the controlling unit 17 is expressed by $$A(s) = A \text{ (A is a constant)} \quad (6)$$

the result is $$H_1(s) = \frac{V_t}{V_r} = \frac{K_1 \cdot r_t \cdot A/J}{s + K_1 \cdot r_t \cdot A/J} \quad (7)$$

Figure 3A:
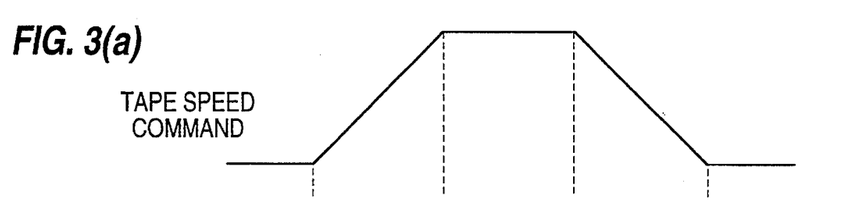
FIGS. 3(a)–3(d) are response characteristic diagrams of the tape speed to the tape speed command signal.
Figure 3B:
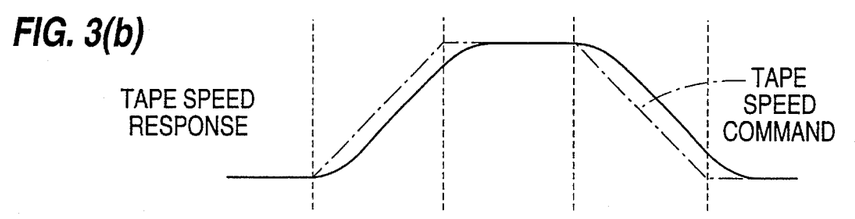

With this structure, if, for example, the tape speed command signal is given as shown in FIG. 3(a). the tape speed response will be as shown in FIG. 3(b).

Furthermore, if the transfer function of the controlling unit 17 for decreasing stationary deviation is expressed by $$A(s) = A (1 + 1/Ts) \text{ (T is a constant)} \quad (8)$$

then $$H_1(s) = \frac{V_t}{V_r} = \frac{2\xi \omega_n \cdot s + \omega_n^2}{s^2 + 2\xi \omega_n \cdot s + \omega_n^2} \quad (9)$$

where $$\xi = \frac{T}{2} \cdot \omega_n \quad (10)$$

$$\omega_n = K_1 \cdot r_t \cdot A/(T \cdot J) \quad (11)$$

Figure 3C:
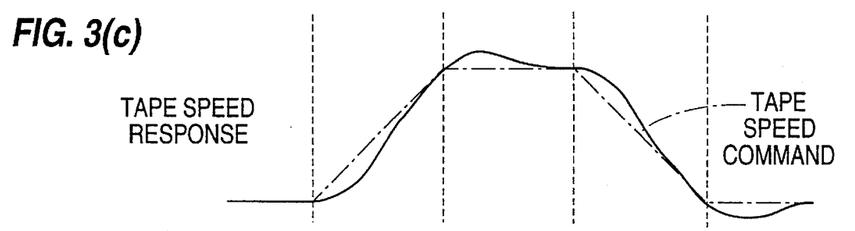

Consequently, if the natural number of vibration $\omega_n$, and coefficient of control $\xi$ are set properly, the tape speed $V_t$ can be controlled by the tape speed command $V_r$. If, for example, the tape speed command as shown in FIG. 3(a) is given, the tape speed response will be as shown in FIG. 3(c).

However, as is clear from the above-mentioned result, a delayed response or an over-shooting in actual tape speed will be caused. The time delay can be shortened by increasing the response frequency of the feedback system. However, it is difficult to realize the very high response frequency of the feedback system.

In this respect, in accordance with the present invention, such an additional feed forward control system is provided that obtains a torque necessary for the acceleration and deceleration of the second motor 9 from the tape speed command, and adds the resultant torque signal to the torque command signal in the feedback system, to drive the second motor 9. As a result, it is possible to remarkably improve the response in association with the change of the tape speed command.

The transfer function $H_2$ from the tape speed command signal $V_r$ to the tape speed $V_t$ in the arrangement in accordance with the present invention with the portion enclosed by the dotted line in FIG. 2 is determined by the following formula:

$$H_2(s) = 1 \tag{12}$$

Figure 3D:
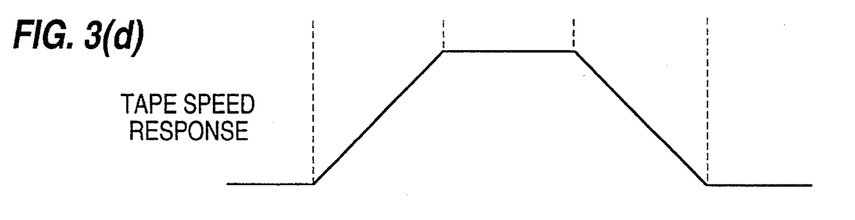

The relationship between the tape speed command value $V_r$ and the tape speed $V_t$ is expressed by a formula which does not contain s, so that operation can be made with fidelity in response to the tape speed command. In case the tape speed command is given as shown in FIG. 3(a), the tape speed response thereto is made as shown in FIG. 3(d). Although errors of the acceleration torque command outputted by the multiplier 22 as well as travel load fluctuations of the tape may actually occur, such errors can be absorbed by the feedback loop.

Thus, according to the present invention, the occurrence of the time delay or overshoot can be substantially eliminated.

Figure 4:
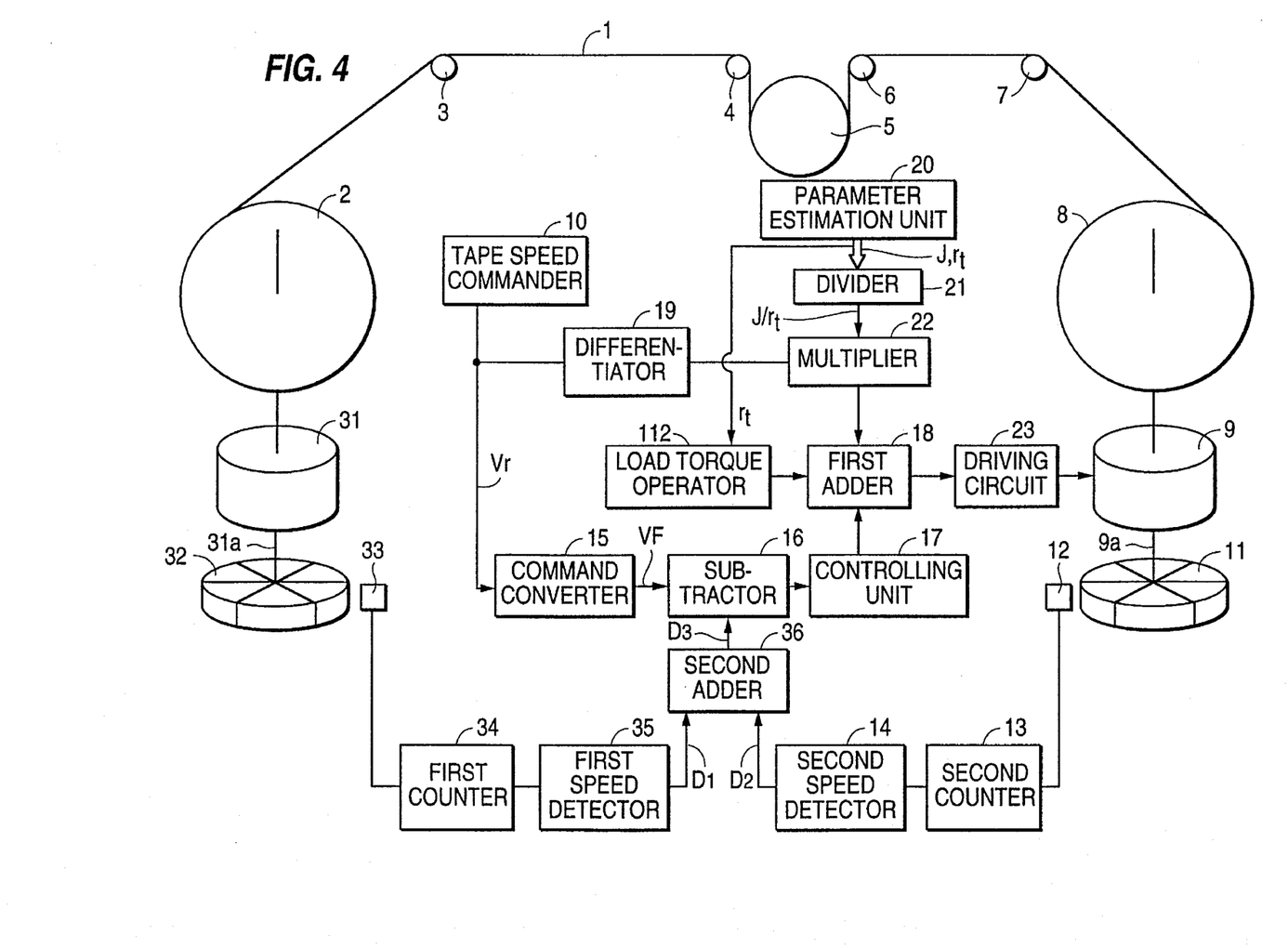
FIG. 4 is a structural diagram of a tape speed control apparatus in accordance with a second embodiment of the invention.

Next, a second embodiment of the present invention will be described with reference to FIG. 4. In the second embodiment of the present invention, the tape speed is detected in a different manner. The second embodiment of the present invention will be described with reference to FIG. 4. In FIG. 4, the components which are the same as those of the first embodiment are indicated by the same reference numerals. Also, the first adder 18, second counter 13 and second speed detector 14 in FIG. 4 are the same as the adder 18, counter 13 and speed detector 14 in FIG. 1. The second embodiment is provided with a magnet 32 mounted on a rotary shaft 31a of the first motor 31, a magnetic flux detection element 33 magnetically coupled to the magnet 32, a first counter 34 connected to the magnetic flux detection element 33, a first speed detector 35 connected to the first counter 34, and a second adder 36 connected to the first and second speed detectors 35 and 14 and to the subtractor 16. The magnet 32 has been magnetized with the same number of poles as that of the magnet 11, and during one rotation of the supply reel 2, the magnetic flux detection element 33 produces the same number of pulses Z as that produced by the counterpart on the side of the take-up reel 8. The detection time period of the first speed detector 35 is also $t_1$. The output value $D_1$ of the first speed detector 35 can be expressed by the following formula:

$$D_1 = K_3 \cdot V_t, \quad K_3 = \frac{Z \cdot t_1}{2\pi r_s} \tag{13}$$

where $V_t$ is the tape speed, $K_3$ is a detection sensitivity, and $r_s$ is a winding radius of the supply reel 2. The second adder 36 adds the output value of the first speed detector 35 and second speed detector 14. The output value $D_3$ of the second adder 36 is expressed by the following formula.

$$D_3 = K_4 \cdot Z \cdot t_1 \cdot (1/r_t + 1/r_s) \tag{14}$$

where $K_4$ is a detection sensitivity with respect to the tape speed. The output value $D_3$ represents a detected tape speed.

Figure 5:
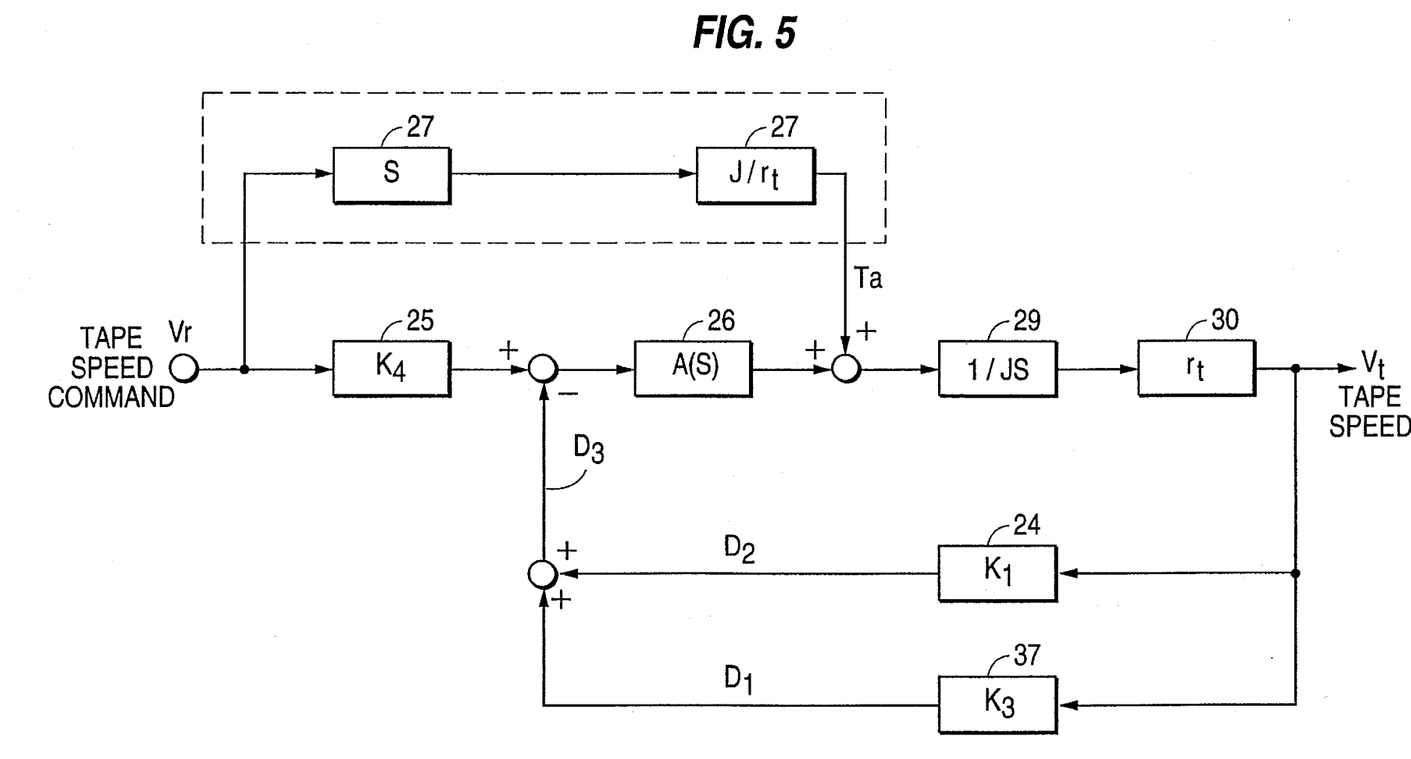
FIG. 5 is a transfer function block diagram of the tape speed control apparatus in accordance with the second embodiment of the present invention.

At this time, the conversion coefficient $K_2$ of the command converter 15 is assigned the same value as that of $K_4$. FIG. 5 is a block diagram representing an equivalent transfer function of this structure. Element 37 here designates a transfer function from the tape speed to the output value of the first speed detector 35.

Such a tape speed detection process provides the following effects as compared with that of the first embodiment. For one thing, the tape speed detecting accuracy can be increased. In particular, when the winding radius of the take-up reel 8 is large, the instant structure makes it possible to improve the tape speed detecting accuracy, which is rendered very low in the first embodiment. Another thing to be noted is that if the tape is accumulated on the take-up reel 8 as it travels, with the first embodiment, the fluctuation of inertia moment and so on may cause the displacement of position of the feedback loop poles, whereby the feedback system will become low in response. On the other hand, with the second embodiment, the improved tape speed detection sensitivity as just described can prevent any fluctuation of the characteristics of the feedback system which may be caused by the tape travel.

In addition to the above-described features of the second embodiment, the winding radius value $r_t$ of the take-up reel 8 outputted from the parameter estimation unit 20 is used to calculate the load torque of the second motor 9 caused by the tension of the tape 1. The load torque value caused by the tape tension can be obtained by the calculation expressed as $F_t \cdot r_t$ in a load torque operator 112 where $F_t$ is the tape tension and a value of the tape tension is determined from specifications of the apparatus. The thus calculated value of the load torque is added by the first adder 18 to the output value of the multiplier 22 and controlling unit 17, so that the tape speed can be controlled with higher precision.

Figure 6:
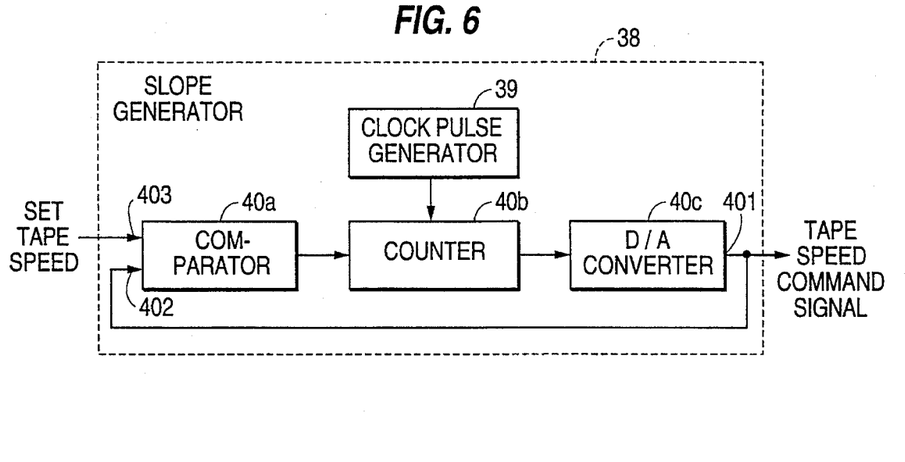
FIG. 6 is a structural diagram of an example of a tape speed commander.
Figure 7A:
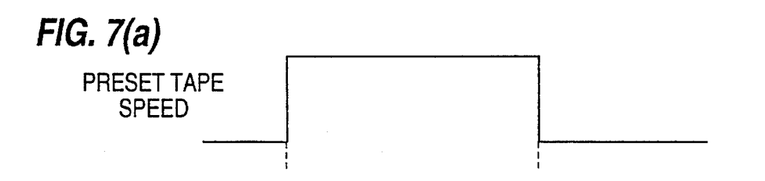
FIGS. 7(a)–7(c) are signal diagrams of the tape speed commander shown in FIG. 6.
Figure 7B:
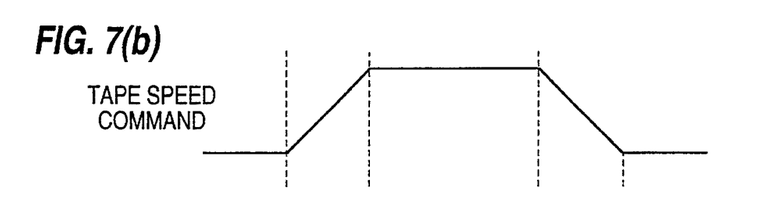

Now, a description follows of the tape speed commander 10. The tape speed commander 10 produces and outputs a tape speed command signal $V_r$ in response to a desired tape speed which is set by an external device such as a shuttle dial. The tape speed commander 10 may be constituted by, for example, a slope generator 38 as shown in FIG. 6. Referring to FIG. 6, a clock pulse generator 39 generates a clock pulse. A signal of an output terminal 401 of a D/A converter 40c is returned to an input terminal 402 of a comparator 40a. The comparator 40a compares a signal of its one input terminal 402 with a set tape speed inputted to a terminal 403 and outputs a result to a counter 40b. If the value at the terminal 402 is smaller than the set tape speed, the counter 40b counts up in response to each clock pulse from the clock pulse generator 39, and if the set tape speed is smaller than the value at the terminal 402, the counter 40b counts down. If the value at the terminal 402 is equal to the set tape speed, the counter 40b stops counting. The D/A converter 40c converts the count value of the counter 40b to a tape speed command signal. As a result, if the set tape speed is as shown in FIG. 7(a), the tape speed command produced by the tape speed commander 10 will be as shown in FIG. 7(b).

Figure 7C:
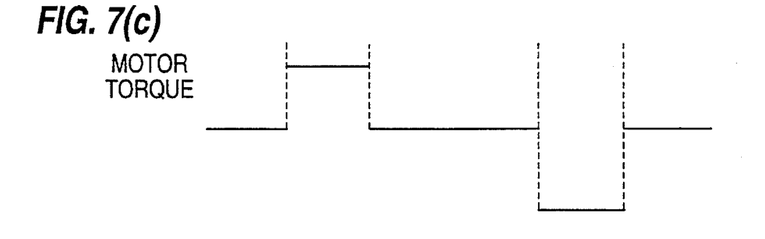

In this case, however, the driving torque of the second motor 9 becomes as shown in FIG. 7(c) since it is proportional to the differentiation of the tape speed command. That is, the torque of the second motor 9 is discontinuous instantaneously at the time when the-tape speed command signal is increased or decreased. Particularly, if a quick response is to be made to the set tape speed, impact noise may be produced or no smooth operation may take place.

Figure 8:
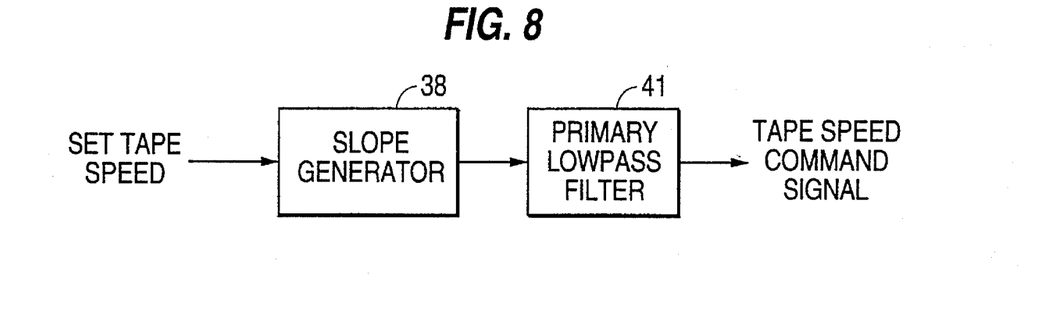
FIG. 8 is a structural diagram of another example of a tape speed commander.
Figure 9A:
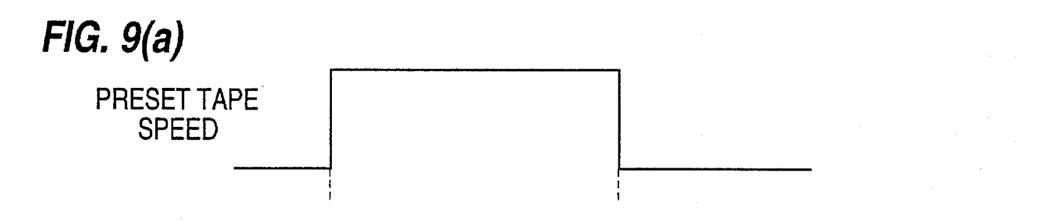
FIGS. 9(a)–9(d) are signal diagrams of the tape speed commander shown in FIG. 8.
Figure 9B:
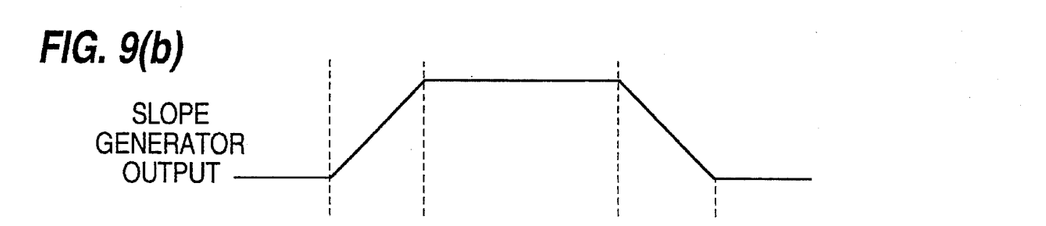
Figure 9C:
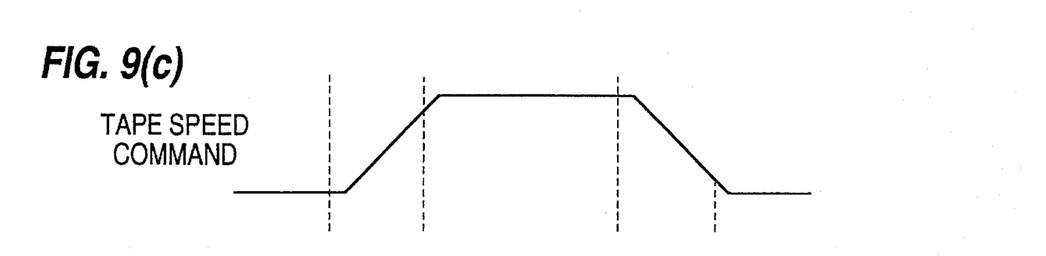
Figure 9D:
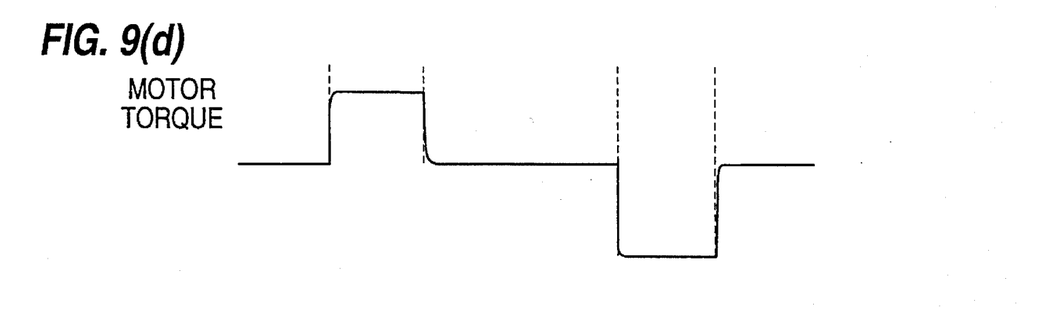

In this connection, the tape speed commander 10 may have such an arrangement as shown in FIG. 8. The output of the slope generator 38 is connected with, for example, to an additional shock absorber such as a primary low-pass filter 41 having a properly short time constant. FIGS. 9(a)–9(d) illustrate a set tape speed, an output signal of the slope generator 38, a tape speed command signal, and a torque signal of the second motor 9, respectively. As is clear from these figures, any torque appearing in the second motor 9 never becomes discontinuous at the start or end of either acceleration or deceleration with no consequential impact noise involved. Accordingly, smooth acceleration and deceleration will be carried out.

Figure 10:
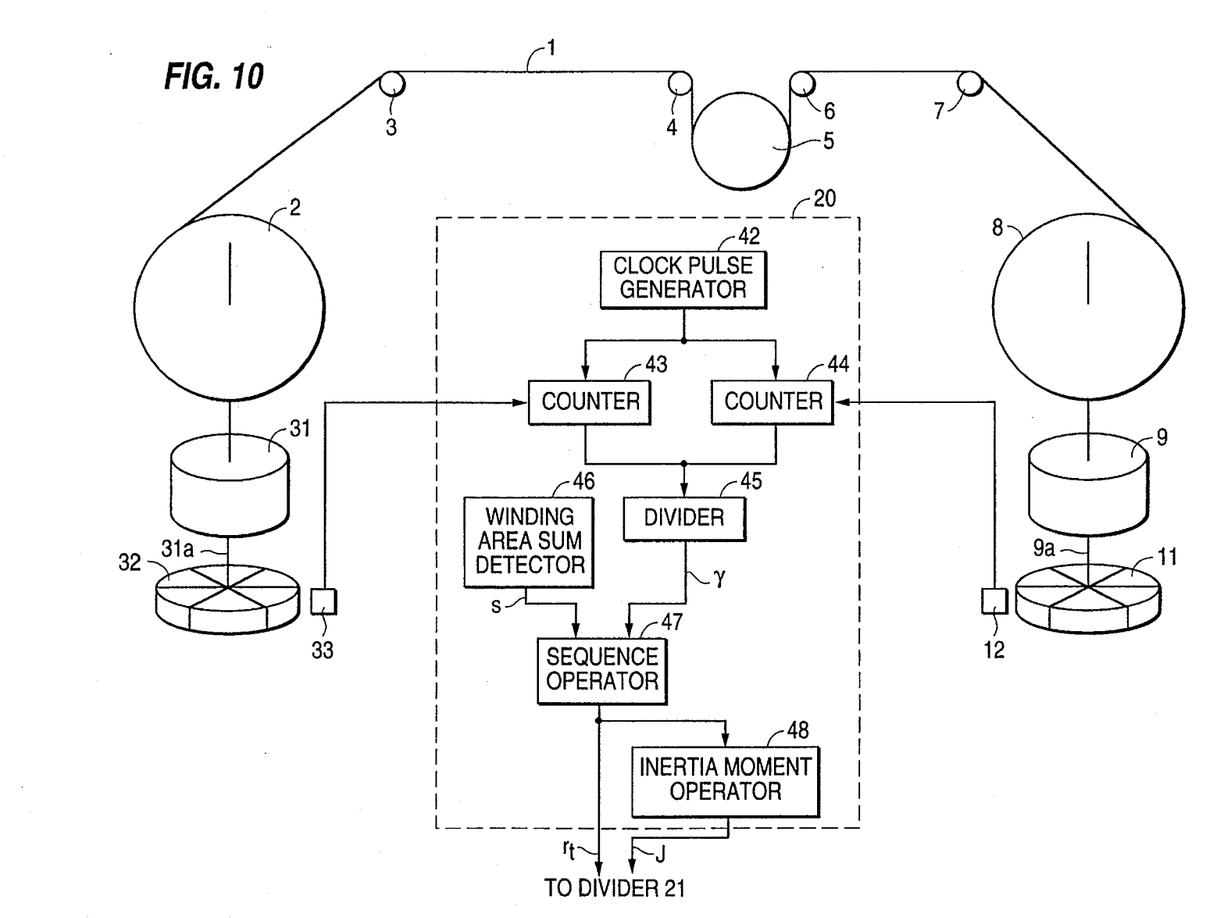
FIG. 10 is a structural diagram of an example of a parameter estimation unit.

Finally, the parameter estimation unit 20 is explained. The parameter estimation unit 20 estimates the values of the winding radius $r_t$ and the moment of inertia J on the take-up reel 8, which are changing every moment as the tape runs. An example of the parameter estimation unit 20 is shown in FIG. 10. Referring to FIG. 10, pulses at frequencies propotional to the rotational speed of the supply reel 2 and take-up reel 8 are generated by the magnetic flux detection elments 12 and 33 in association with the magnets 11 and 32 mounted on the rotary shafts 31a and 9a of the first and second motors 31 and 9, respectively. A clock pulse generator 42 generates periodic pulses at a specific period $t_2$ and delivers the pulses to a counter 43 and a counter 44. The counter 43 counts the number of pulses ($N_s$) from the magnetic flux detection element 33 in the specific period $t_2$. Likewise, the counter 44 counts the number of pulses ($N_t$) from the magnetic flux detection element 12 in the specific period $t_2$. A divider 45 calculates a value of the following ratio $\gamma$ of the outputs of the counters 43 and 44.

$$\gamma = \frac{N_t}{N_s} \quad (15)$$

Since the take-up reel 8 and the supply reel 2 are coupled to each other through the tape 1, a value of the winding radius ratio $r_s/r_t$ is given as the value of $\gamma$.

A winding area sum detector 46 detects a value of a sum of an area of a circle whose radius is the winding radius of the tape 1 wound on the supply reel 2 and an area of a circle whose radius is the winding radius of the tape 1 wound on the take-up reel 8 (hereinafter called the winding area sum). The winding area sum is absolutely determined depending on the tape to be used, and is a fixed value not variable with the tape running. Accordingly, right after loading the tape 1, the tape 1 is run for a specific time by using the capstan and pinchroller, and a value of the winding area sum is detected by the winding area sum detector 46.

Figure 11:
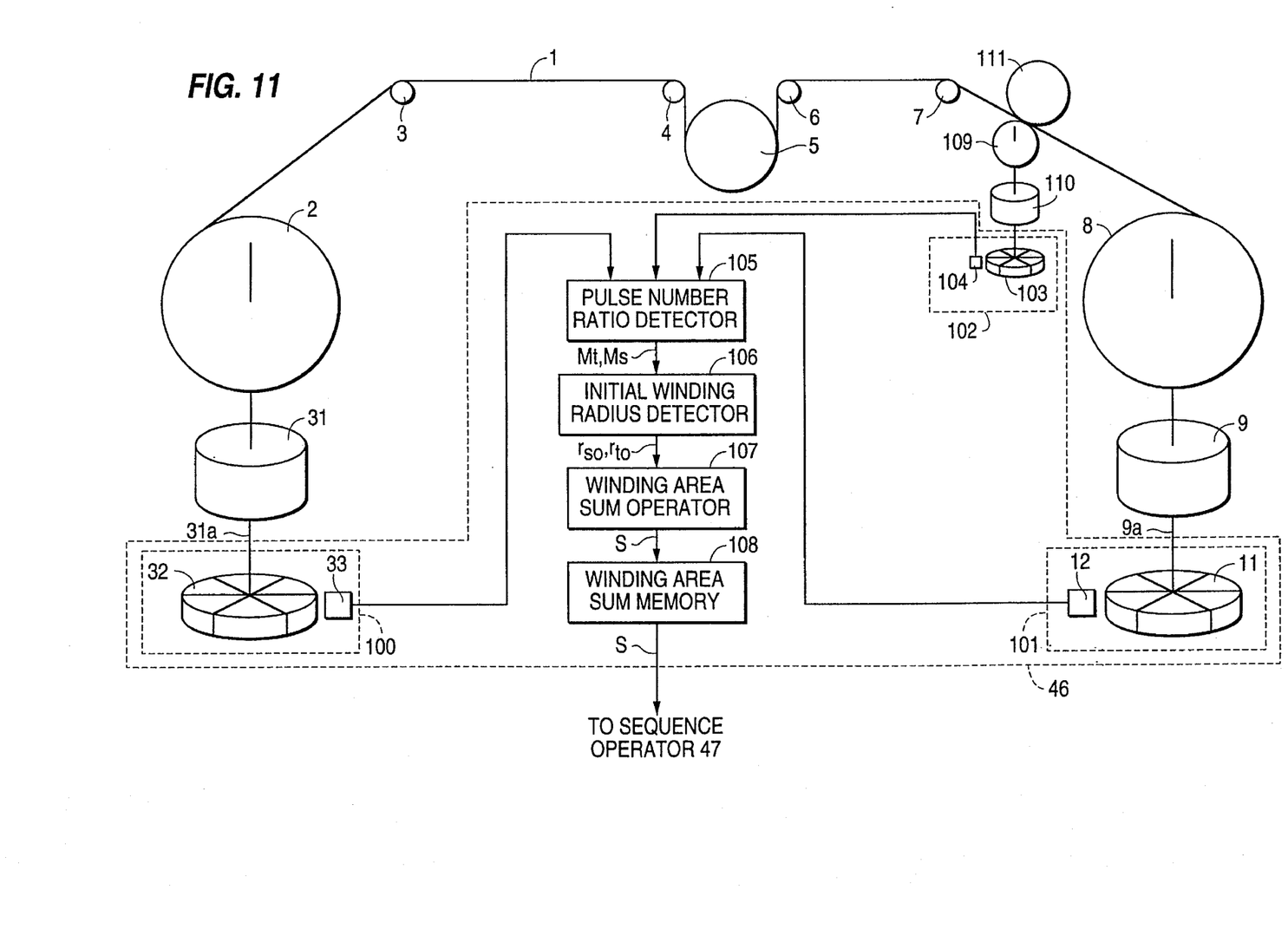
FIG. 11 is a structural diagram of an example of a winding area sum detector.

FIG. 11 is a structural diagram of an example of a winding area sum detector 46. Element 109, 110 and 111 are a capstan, a capstan motor and a pinchroller respectively. Pulse generators 100, 101 and 102 for generating pulses at frequencies proportional to rotational speeds of the motors are disposed on the rotary shafts of the first motor 31, the second motor 9 and the capstan motor 110, respectively. The pulse generator 100, 101 and 102 may be composed of, for example, magnets 32, 11 and 103 magnetized in multiple poles and mounted on the rotary shafts of the motors, and magnetic flux detection elements 33, 12 and 104 confronting the magnets 32, 11 and 103, respectively. Suppose the numbers of pulses generated during one revolution of the capstan 109, take-up reel 8 and supply reel 2 are respectively $Z_c$, Z and Z, and the radius of the rotary shaft of the capstan 109 is $r_c$. Further, suppose the numbers of pulses of the capstan 109, take-up reel 8 and supply reel 2 generated within a specific period are $N_{c0}$, $N_{t0}$ and $N_{s0}$, respectively, the ratio of the numbers of the pulses of the capstan and take-up reel 8 is $M_t$, and the ratio of the numbers of the pulses of the capstan 109 and supply reel 2 is $M_s$. Since the capstan 109, take-up reel 8 and supply reel 2 are coupled through the tape 1, the following relationships hold:

$$M_t = \frac{N_{c0}}{N_{t0}} = \frac{r_{t0} \cdot Z_c}{r_c \cdot Z} \quad (16)$$

$$M_s = \frac{N_{c0}}{N_{s0}} = \frac{r_{s0} \cdot Z_c}{r_c \cdot Z} \quad (17)$$

where, rt0 and rs0 are the initial winding radius of the take-up reel 8 and initial winding radius of the supply reel 2 at the moment. From equations (16), (17), we obtain the following equations.

$$r_{t0} = \frac{Z}{Z_c} \cdot r_c \cdot M_t \quad (18)$$

$$r_{s0} = \frac{Z}{Z_c} \cdot r_c \cdot M_s \quad (19)$$

Hence, supposing the winding area sum to be S, it may be expressed as in the following equation (20) by using the winding radii of the take-up reel 8 and supply reel 2 obtained in equations (18) and (19).

$$S = \pi (r_{t0}^2 + r_{s0}^2) \quad (20)$$

That is, right after loading the tape 1, the tape 1 is run for a specific time by the capstan 109 and pinchroller 111, and a value of the pulse number ratio $M_t$ of the capstan and take-up reel 8, and the pulse number ratio $M_s$ of the capstan and supply reel 2 are determined in a pulse number ratio detector 105 from the pulses outputted from pulse generators 100, 101 and 102. Then values of initial winding radii $r_{t0}$ and $r_{s0}$ are calculated by an intial winding radius detector 106 from an output value of the palse number ratio detector 105 according to equations (18) and (19). Finally, a winding area sum operator 107 calculates a winding area sum value S from the values of the initial winding radii according to equation (20), and the resultant value is saved in an winding area sum memory 108.

The winding area sum S is constant if the tape is the same, and it is not necessary to change the value of S as long as the tape is the same. If only one type of tape is used, a value of S may be set beforehand.

From a value of the winding radius ratio $\gamma$ delivered by the divider 45 and a value of the winding area sum S delivered by the winding area sum detector 46, a value of the winding radius of the take-up reel 8 can be determined by a sequence operator 47. Since the winding radii of the supply reel 2 and take-up reel 8 are respectively $r_s$ and $r_t$, the winding radius ratio $\gamma$ is obtained by the equation (21).

$$\gamma = \frac{r_s}{r_t} \quad (21)$$

The winding area sum S is obtained by the following equation by using the winding radii of the supply reel 2 and take-up reel 8.

$$S = \pi (r_t^2 + r_s^2) \quad (22)$$

From the relationship of equations (21) and (22), the winding radius of the take-up reel 8 is obtained by equation (23).

$$r_t = \sqrt{\frac{S/\pi}{1 + \gamma^2}} \quad (23)$$

Here, as known from equation (23), it is necessary to calculate the square root. Accordingly, to calculate the square root, the known Newton-Raphson numerical calculation method may be employed. To determine the square root of N (>0), the solution to the equation $$f(x) = x^2 - N = 0 \quad (24)$$

may be determined. By applying the Newton-Raphson method in this calculation, assuming the initial value $x_0=N$, it is possible to obtain the solution by the repetitive calculation of equation (25).

$$x_{i+1} = x_i - \frac{f(x_i)}{f'(x_i)} = \frac{x_i^2 + N}{2x_i} \quad (25)$$

(where i=0, 1, 2, ...)
That is, to calculate the equation, $$x_0 = N = \frac{S/\pi}{1 + \gamma^2} \quad (26)$$

is determined, and by repeatedly executing the calculation of equation (25), the winding radius of the supply reel 2 is obtained. The operation is guaranteed to be converged always on the solution. Further, the convergence is very promt as compared with the generally known successive dividing method or linear inverse interpolation method, and the convergence is achieved in secondary step. Accordingly, these operations can be performed in a short processing time.

Accordingly, in the sequence operator 47, from the output value $\gamma$ of the divider 45 and the output value S of the winding area sum detector 46, the initial value $x_0$ is determined by the calculation expressed in formula (26), the sequence obtained by the progressive formula expressed in equetion (25) is calculated, and the value of the element $x_n$ obtained by repetitive calculation of the progressive formula by n times (n being a specific natural number) is delivered as the winding radius of the take-up reel 8. When a large value is selected for the specific natural number n, a sufficiently converged result is obtained, but a proper value may be selected in consideration of the operation time and required precision.

Futhermore, a value of the winding radius $r_t$ of the take-up reel 8 obtained in the sequence operator 47 is fed to an inertia moment operator 48. Since the take-up reel 8 is comprised, as is well-known, by a reel hub and a tape wound on the reel hub, the inertia moment operator 48 performs the following calculating equation (27) to obtain a value of the moment of inertia J of the take-up reel 8:

$$\begin{aligned} J &= J_t + J_h \quad (27) \\ &= J_h + \frac{\pi \rho H(r_t^4 - r_h^4)}{2} \end{aligned}$$

where $J_t$ and $J_h$ are moments of inertia of the take-up reel hub and a tape wound on the take-up reel 8, $r_t$ is the winding radius of the take-up reel 8, $r_h$ is the radius of the take-up reel hub, $\rho$ is the specific gravity of the tape 1, and H is the width of the tape 1.

According to the invention, therefore, a value of the winding radius of the take-up reel 8 can be determined in a short time from values of the winding radius ratio $\gamma$ and winding area sum S of the supply reel 2 and take-up reel 8. Hence, the conventionally required momory for the conversion table for determining a value of the winding radius $r_t$ of the take-up reel 8 from a value the winding radius ratio is not needed. In particular, when using a tape changing largely in the winding radius, or when using multiple types of tapes differing in tape length from one another, the conversion table and the memory therefor are not needed. Moreover, the torque of the second motor 9 is calculated according to the winding radius or moment of inertia, and feed-forward driving is effected. Accordingly, it is necessary to determine these parameter, such as winding radius and moment of inertia, at high precision. In such a case, too, since the winding radius is determined by calculation, it is easy to detect the winding radius and moment of inertia changing with the running of the tape at high precision.

What is claimed is:

1. A tape speed control apparatus comprising:

a first reel on which a tape is wound;

a second reel for drawing the tape out or the first reel and taking up the tape;

a first motor for directly driving the first reel and giving a specific back tension to the tape;

a second motor for directly driving the second reel;

a tape speed command means for producing a tape speed command signal from a specific tape speed set from outside;

a differentiator for differentiating the tape speed command signal;

a parameter estimation unit for estimating a moment of inertia of the second reel and a winding radius of the tape wound on the second reel;

a divider for determining from an output of the parameter estimation unit a ratio of the moment of inertia of the second reel to the winding radius of the tape wound on the second reel;

a multiplier for multiplying an output of the differentiator by an output of the divider;

a tape speed detecting means for detecting a tape speed;

a comparing means for comparing an output of the tape speed detecting means with the tape speed command signal;

an adder for summing at least an output of the multiplier and an output of the comparing means; and a driving circuit for generating a torque proportional to an output of the adder in the second motor;

wherein the parameter estimation unit comprises:

a winding radius ratio detector, operable when the tape is being moved, for detecting a winding a radius ratio of a winding radius of the tape wound on the first reel and the winding radius of the tape wound on the second reel at predetermined intervals of time when the tape is being moved, said winding radius ratio detector comprising: a first rotation speed detector for detecting a rotation speed of the first reel, a second rotation speed detector for detecting a rotation speed of the second reel, and a detector for detecting a rotation speed ratio of the rotation speed of the second reel detected by the second rotation speed detector with respect to the rotation speed of the first reel detected by the first rotation speed detector at the predetermined intervals of time when the tape is being moved, the detected rotation speed ratio being outputted as the winding radius ratio;

a winding area sum detector for detecting a sum of an area of a circle whose radius is the winding radius of the tape wound on the first reel and an area or a circle whose radius is the winding radius of the tape wound on the second reel;

a winding radius operator for determining the winding radius of the tape wound on the second reel from an output of the winding area sum detector and an output of the winding radius ratio detector; and an inertia moment operator for calculating the moment of inertia of the second reel from an output of the winding radius operator.

2. An apparatus according to claim 1, wherein the winding radius operator for producing, as a value of the winding radius of the tape on the second reel, an element $X_n$ (n being a specific natural number) in a sequence $X_0, X_1, X_2, \ldots X_n$ given in the following formula:

$$x_{i+1} = \frac{x_i^2 + x_0}{2x_i}, \quad x_0 = \frac{S/\pi}{1+\gamma^2} \quad (i=0, 1, 2, \ldots)$$

where $\gamma$ is a value of the output of the winding radius ratio detector, and S is a value of the output of the winding area sum detector.

* * * * *